Feb. 11, 1958 H. C. KEYSOR Re. 24,429

COIL SPRING

Original Filed Nov. 30, 1949

INVENTOR.

Harold C. Keysor

BY

Orin B. Garner Atty.

United States Patent Office

Re. 24,429
Reissued Feb. 11, 1958

24,429

COIL SPRING

Harold C. Keysor, La Grange Park, Ill., assignor to American Steel Foundries, Chicago, Ill., a corporation of New Jersey Original No. 2,695,169, dated November 23, 1954, Serial No. 130,320, November 30, 1949. Application for reissue November 9, 1955, Serial No. 546,019

13 Claims. (Cl. 267—61)

Matter enclosed in heavy brackets [ ] appears in the original patent but forms no part of this reissue specification; matter printed in italics indicates the additions made by reissue.

This invention relates to a spring product and method of making same and more particularly to a helical compression spring.

A conventional compression spring comprises a bar coiled in a number of turns about a helix axis at a predetermined helical angle, the end portions of the bar being tapered to provide flat seats for opposite ends of the spring perpendicular to said axis. In compression, each end turn, approximately three-fourths of which comprises the related end portion, is engaged on its inner face by the outer face of the adjacent second or overlapping succeeding turn, the latter being curved tangentially with respect to and fulcruming with a rocking effect on the inner face of the former. Actually the second turn rolls up the associated end portion whereby the point of contact between the same constantly changes. This shifting of the points of contact is accentuated by the usual deformities on the inner faces of the end portions, the contact occurring at the high spots. As a result of these conditions the spring, under the variable loading, is eccentrically or nonaxially loaded with consequent unequal stress distribution which materially affects the life of the spring.

A general object of the invention is to provide a helical spring of such construction that the resultant load will always be axial.

A more specific object of the invention is to provide raised fulcrums between and fixed to one of the two turns at each end of the coil, the fulcrums being so arranged as to prevent shifting of the point of contact between related two turns.

In this connection, the invention contemplates locating these contact points in a common axial plane of the spring at opposite sides of the helix axis of the spring.

A broad object of the invention is to provide a method of axially loading helical springs.

Another object of the invention is to provide a method for economically forming such a spring.

These and other objects of the invention will become more apparent from the specification and drawing, wherein.

Describing the invention in detail and referring first to

Figure 1:
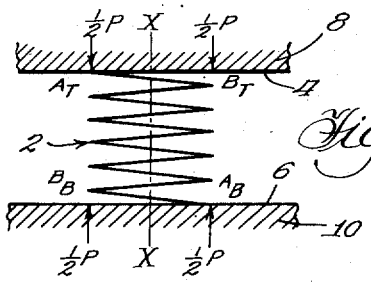
Figure 1 is a diagrammatic illustration of the invention.

Figures 1 to 6, the helical coil spring generally indicated 2 is shown diagrammatically in Figure 1 interposed between parallel plane surfaces 4 and 6 on the relatively movable loading members 8 and 10. The spring is formed from a bar 12 which encircles the axis X—X of the spring with a plurality of turns. The end portions 14 and 16 are tapered to provide flat seating surfaces 18 and 20, respectively, at opposite ends of the spring perpendicular to the helix axis X—X. The end portions 14 and 16 are deformed and offset inwardly of the spring adjacent their outer ends as at 22 and 24 to provide fulcrums 26 and 28 which project outwardly from the inner faces 30 and 32 of the end portions 14 and 16. The contact point between fulcrum 28 and the adjacent second or succeeding turn is indicated at $A_T$ and the contact point between fulcrum 26 and the adjacent second or succeeding turn is indicated at $A_B$. These points $A_T$ and $A_B$ are located in a common axial plane of the spring at opposite sides of the axis X—X. Expressed in turns of the coil, these points are spaced from each other at an angle equal to a whole number of turns plus one half turn, a turn being 360°, or, stated alternatively, the angle between $A_T$ and $A_B$ is equal to [N $\pi$ where N is any odd integral number] *$(2N+)1\pi$ radians wherein N is the number of whole turns.*

For point A on each end turn there is a corresponding load point B on the same end turn at the diametrically opposite side of the axis X—X. Thus at the upper end of the spring as shown in Figure 1 the diametrically opposite points are $A_T$ and $B_T$ and at the lower end of the spring the diametrically opposite points are $A_B$ and $B_B$. It will be readily apparent that all the points A and B are in a common axial plane and that points $A_T$ and $B_B$ are aligned longitudinally of the spring and disposed at one side of axis X—X and that points $B_T$ and $A_B$ are aligned longitudinally of the spring and disposed at the opposite side of the axis X—X. The load indicated P is applied at $A_T$ and $B_T$ and, as seen in Figure 1, ½P acts at $A_T$ and ½P acts at $B_T$. Similarly, the reaction is exerted ½P at $B_B$ and ½P at $A_B$.

In the spring described, when loaded between plane parallel faces the load forces and stresses on each coil are equalized therearound, and the center of gravity of the load is on the axis X—X.

Figure 2:
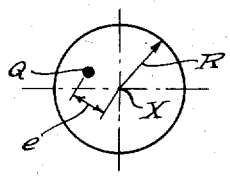
Figure 2 is a force diagram showing conditions of axial and nonaxial loading.
Figure 3:
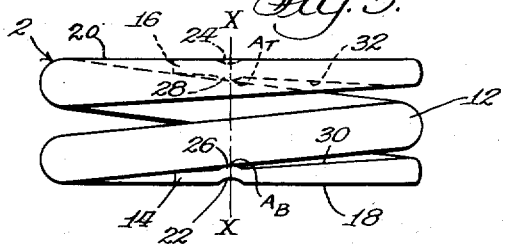
Figure 3 is a side elevational view of one form of spring made in accordance with the invention.
Figure 6:
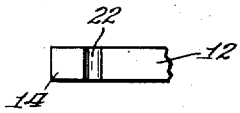
Figure 6 is a fragmentary view of one end portion of the bar taken from the seating surface thereof.

Referring now to Figure 2, it will be seen that if the center of gravity of the load is on the X axis, the maximum stress around each turn is equally distributed and equals a constant K times (PR) where R is the radius of the coil centered at X. Under a nonaxial condition, the center of gravity of load P is located at a point Q which is eccentric distance e from the axis X, the maximum stress on each turn is materially increased and, as well understood in the art, equals a constant K times [P(R+e)] whereby the stresses around each turn are unequalized.

Figure 7:
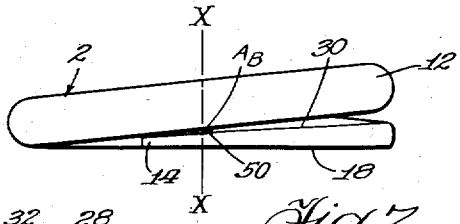
Figures 7 and 8 are fragmentary side elevational views of springs showing modifications of the invention.
Figure 5:
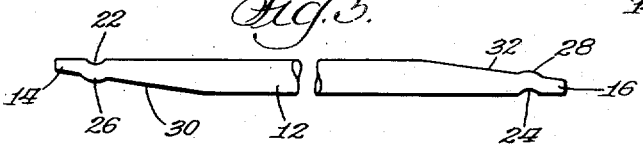
Figure 5 is a broken-apart side view of the bar from which the spring in Figures 3 and 4 is made.
Figure 8:
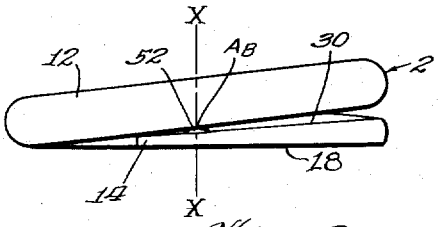
Figure 4:
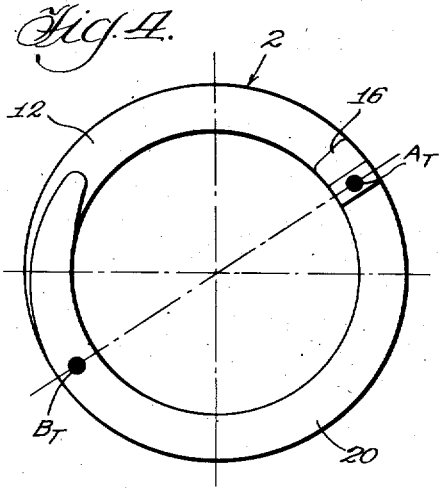
Figure 4 is an end view of the spring shown in Figure 3.

Referring now to Figures 7 and 8 wherein parts corresponding to those shown in the preceding modification are identified by corresponding reference numerals, each contact point $A_B$ or $A_T$ on spring 2 in Figure 7 is afforded by a boss or fulcrum 50 which is formed integral with or suitably secured to the second turn from each end of the coil. In Figure 8 each fulcrum or contact member 52 may be formed integral with or secured to the inner face of the associated end portion in any convenient manner, as by welding.

It will be understood that the fulcrums could be located on the members which seat against the ends of the spring and load the same, the fulcrums extending between adjacent end coils.

The spring shown in Figures 1 to 6 may be cutting a bar of metal to length. The bar may then be tapered at opposite ends in usual manner. The end portions of the bar may then be inserted in a press to deform the same and form the fulcrums spaced from each other a distance equal to a whole number of turns plus a half turn into which the bar is to be coiled. The bar is then coiled on a mandrel in the usual manner with the fulcrums facing inwardly of the spring. The seating surfaces on the end portions if not perpendicular to the helix axis are then ground.

The springs shown in Figures 7 and 8 may be similarly formed except that where the fulcrums are connected to the end or second turns, they may be applied before or after the bar is coiled or the bar is initially formed with the integral fulcrums, followed by the tapering, coiling and grinding steps.

*As the end turns or coils of a conventional compression spring do not contribute to spring deflection, they are known as and referred to in the spring art as "dead" or "inactive" coils and are deducted from the total coils to obtain the active coils required in conventional deflection formula. To provide a compression spring structure having a constant number of active coils and a constant definite load rate, it will be noted that each of the several forms of the invention herein shown and described embodies a fulcrum or contact means disposed between each end coil and its respective adjacent coil, said means being fixed on one of said coils and in contact engagement with its associated coil prior to loading and compression of the spring structure. To provide a compression spring structure having a definite and precise load rate, suitable for use in precision instruments, the fulcrum members must necessarily be located on the spring to provide the desired load rate, without regard to axial loading of the spring.*

It will be understood that the invention provides a novel, economical, practical, loaded spring wherein the contact points are located in the correct position to secure axial loading, and since these contact points are prevented from shifting, the desired condition of axial loading will be obtained at all loads.

I claim:

1. A straight spring bar for coiling into a helical spring having a pair of fulcrum points projecting transversely of the bar in opposed directions and being spaced from one another a whole number of turns plus one half turn when the bar is coiled with a number of turns about a helix axis to form a helical spring, said points being disposed adjacent the ends of the bar.

2. A round spring bar adapted to be coiled in a plurality of turns into a helical compression spring having tapered end portions adapted to provide flat seats for opposite ends of the spring substantially perpendicular to the axis of the spring, and fulcrum means on said end portions only adapted to engage an adjacent turn, the fulcrum on one end portion being spaced from the fulcrum on the other end portion a distance equal to a whole number of turns plus one half of a turn of said bar when coiled into a spring.

3. A helical coil spring comprising a bar having a plurality of turns encircling the axis of the spring, said bar having tapered end portions providing flat bearing surfaces at opposite ends of the spring extending perpendicular to said axis, and fulcrum means on each end portion formed as an offset thereof inwardly of the spring for engaging the succeeding turn, respective fulcrum means being spaced from each other in accordance with the following expression: $N+\frac{1}{2}$ wherein N represents a whole number of turns.

4. A helical compression spring comprising a bar encircling the axis of the spring a plurality of times, said bar being provided with flat surfaces at opposite ends affording seats for said spring substantially perpendicular to said axis, and fulcrum means on the bar adjacent each end thereof and each comprising a member disposed between the associated end turn and succeeding turn and fixed to the former and engaging the latter, said fulcrum means being located in a common axial plane of the spring at opposite sides of said axis.

5. A helical compression spring comprising a plurality of turns and end portions at opposite ends affording outwardly facing loading surfaces extending substantially perpendicular to the helix axis of the spring, inwardly facing surfaces on the end portions tangential to adjacent coils of the spring, and fulcrums at opposite sides of said axis between and engaging said inwardly facing surfaces and adjacent coils in a common plane passing through said axis.

6. In a helical spring, a bar coiled in a plurality of turns about a helix axis, said bar having tapered end turns providing flat bearing surfaces at opposite ends of the spring perpendicular to said axis, and a raised fulcrum between each end turn and the succeeding turn fixed to one thereof and engaging the other, said fulcrums being located at opposite sides of said axis in a common axial plane of said spring.

7. A helical spring comprising a plurality of turns, and a fulcrum between and engaging each end turn and adjacent turn, *said fulcrum being* fixed to one thereof *and in point contact at all times with the other thereof, the end turn and adjacent turn being otherwise spaced from each other,* said fulcrums being related to each other in accordance with the following expression: $(2N+1)\pi$ *radians* [$N\pi$], wherein N represents [an odd integral] *the* number of *whole* turns.

8. A helical spring comprising a plurality of turns, and a fulcrum between and engaging each end turn and adjacent turn, *said fulcrum being* fixed to one thereof *and in point contact at all times with the other thereof, the end turn and adjacent turn being otherwise spaced from each other,* said fulcrums being located in a common axial plane of the spring at opposite sides of the helix axis thereof.

*9. A helical compression spring structure comprising a plurality of turns encircling the axis of the spring, each end turn and its respective adjacent turn being spaced apart and having a fulcrum means fixed to one thereof and extending at all times in point contact with the other thereof to provide a spring having a constant number of active turns and a constant definite load rate.*

*10. A helical compression spring structure comprising a plurality of turns encircling the axis of the spring, each end turn and its respective adjacent turn being spaced apart and having a fulcrum means extending therebetween to provide a spring having a constant number of active turns and a constant definite load rate, each fulcrum means being secured to and spaced at all times from the end of its respective end turn in point contact engagement with its respective adjacent turn.*

*11. A helical compression spring structure comprising a plurality of turns encircling the axis of the spring, each end turn and its respective adjacent turn being spaced apart and having a fulcrum means extending therebetween to provide a spring having a constant number of active turns and a constant definite load rate, each fulcrum means being secured to its respective adjacent turn for abutting point contact engagement at all times against its respective end turn.*

*12. A helical compression spring structure having a constant number of active turns and a constant definite load rate, said structure comprising stationary fulcrum means disposed between each end turn and its respective adjacent turn, each fulcrum means being secured to its respective end turn and in constant point contact engagement with its respective adjacent turn.*

*13. A helical compression spring structure having a constant number of active turns and a constant definite load rate, said structure comprising stationary fulcrum means disposed between each end turn and its respective adjacent turn, each fulcrum means being spaced from the end of and secured to its respective end turn and in constant point contact engagement with its respective adjacent*

*turn, each end turn and adjacent turn being otherwise spaced from each other.*

References Cited in the file of this patent or the original patent

UNITED STATES PATENTS

| | | |
|---|---|---|
| 361,298 | Kilmer | Apr. 19, 1887 |
| 436,320 | Stevens | Sept. 9, 1890 |
| 446,203 | Cochennour et al. | Feb. 10, 1891 |
| 843,827 | Knudsen | Feb. 12, 1907 |
| 1,250,585 | Johnson | Dec. 18, 1917 |
| 1,300,658 | Sebastian | Apr. 15, 1919 |

| | | |
|---|---|---|
| 1,424,940 | Pickard | Aug. 8, 1922 |
| 1,826,060 | Eaton | Oct. 6, 1931 |
| 2,026,007 | White | Dec. 31, 1935 |
| 2,260,606 | Clark | Oct. 28, 1941 |
| 2,265,629 | Christiansen | Dec. 9, 1941 |
| 2,359,900 | Endsley | Oct. 10, 1944 |
| 2,385,357 | Haas | Sept. 25, 1945 |
| 2,387,264 | Holland | Oct. 23, 1945 |
| 2,480,783 | Sloan | Aug. 30, 1949 |

FOREIGN PATENTS

| | | |
|---|---|---|
| 112,850 | Sweden | Nov. 2, 1944 |
| 499,254 | France | Nov. 14, 1919 |